July 2, 1929.  A. W. STOTT  1,719,631
APPARATUS FOR CANNING CITRUS FRUIT
Filed July 29, 1926  2 Sheets-Sheet 2
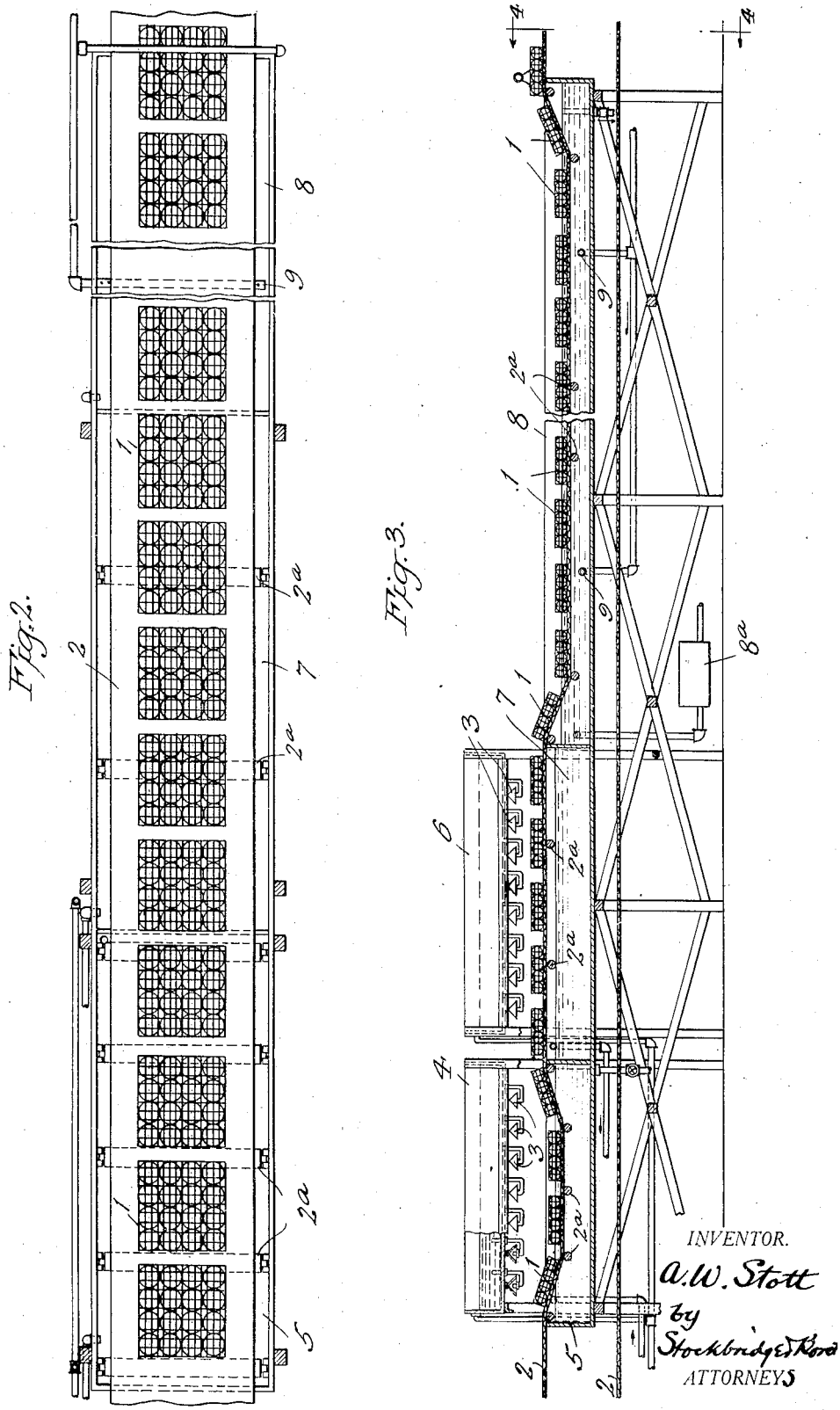

Patented July 2, 1929.

1,719,631

UNITED STATES PATENT OFFICE.

ALEXANDER W. STOTT, OF CLEARWATER, FLORIDA, ASSIGNOR TO THE HILLS BROTHERS COMPANY, INC., A CORPORATION OF NEW YORK.

APPARATUS FOR CANNING CITRUS FRUIT.

Application filed July 29, 1926. Serial No. 125,715.

This invention relates to the preparation and canning of citrus fruits, particularly to the canning of hearts or segments of grapefruit and is an improvement upon the method and apparatus disclosed in the patent issued to E. H. Lefevre, No. 1,514,774, November 11, 1924, for process and apparatus for canning citrus fruits.

It has been found that the system described in the patent referred to is not entirely satisfactory for the reason that the section of the apparatus designated as "unit B" or the unit for removing the "rag" and partitions between the segments, does not remove the "rag" satisfactorily. The particular fault seems to lie in an inadequate treatment of the bottom portions of the fruit.

It is the object of this invention therefore to improve the "rag" removing units so as to remove all of the "rag" and partition membranes completely and without injury to the fruit. To accomplish this purpose this invention contemplates treating the peeled fruit chemically by gently spraying the top portions of the fruit with a caustic or other suitable solution and immersing the lower portions in a similar solution, then spraying the top portions with rinsing water and immersing the fruit into chilled and agitated water to remove all the remaining "rag". After this treatment the fruit may be subjected to a draft of air to dry the fruit.

The apparatus employed in carrying out this invention is similar in many respects to that described in detail in the patent issued to Lefevre. The entire system may be termed a conveyor system inasmuch as the fruit is placed upon a conveyor or series of conveyors which carry the fruit by several stations such as a peeling station, "rag" removing station, including a drying section, a sectionalizing station and a packing station. Conveyors are used to convey the fruit through the different units and also to carry the containers to the packing station.

A more detailed description will now be given with particular reference to the drawings, in which:

Fig. 2 is a plan of the unit for removing the "rag";

Fig. 3 is a side elevation partly in section of the unit for removing the "rag"

Figure 1:
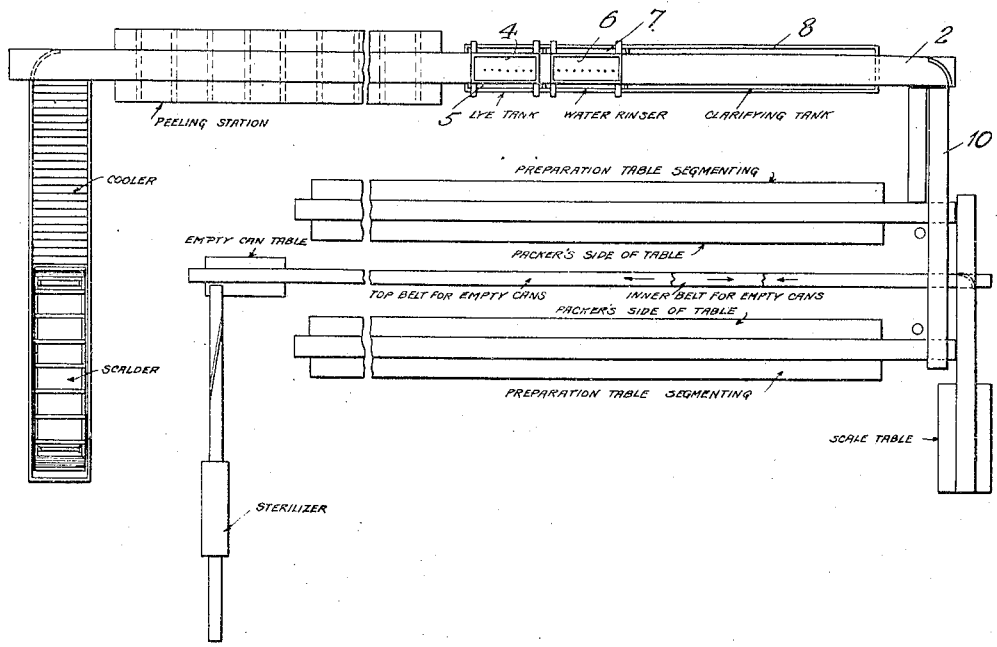
Fig. 1 is a diagrammatic layout of the system embodying this invention.
Figure 4:
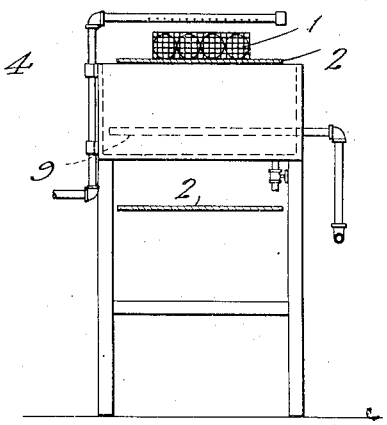
Fig. 4 is an end elevation taken at line 4—4 of Fig. 3.

The fruit to be treated is subjected to the usual preliminary treatment prior to peeling by being passed through a scalding tank and a cooling tank after which it is peeled at the peeling station (Fig. 1). The peeled fruit, with the fibrous membranes or inner peel, termed in the art as the "rag", partially softened by the scalding and cooling treatment, is placed in wire or other porous baskets 1 upon a conveyor 2 moving over rollers 2ª which carries the peeled fruit through the section for removing the "rag". The fruit is first subjected to a treatment of caustic solution by passing the fruit under a series of pressureless sprayers 3 which connect to an overhead caustic solution tank 4. These sprayers allow a spray of the caustic solution to fall over the top portions of the fruit to soften the "rag" thereon. The solution runs down over the fruit and is collected in a lower reservoir 5 from which it is pumped back into the upper tank by means of a pump and the necessary piping (not shown).

During the time that the conveyor passes under the sprayers the conveyor is caused to dip and run through the solution in the lower tank whereby the fruit is partially immersed in the liquid in the lower tank. This subjects the lower portions of the fruit to the action of the solution and the "rag" upon that portion of the fruit is thoroughly softened, most of it falling from the fruit.

After passing through the caustic solution treatment the conveyor carries the fruit under a section of rinsers comprising a series of pressureless spraying nozzles 3 similar to those used for spraying the caustic solution. These sprayers are supplied from an overhead tank 6 and the liquid drips into a lower tank 7 from which it may be pumped up by any suitable pump to the upper tank. The fruit is thereby washed and any adhering "rag" is washed off the tops of the fruit. Beyond this washing tank is another tank 8 known as the clarifying tank through which the conveyor passes immersing the fruit partially or totally in the water if desired. This tank contains chilled water which is constantly being changed at a rate so as to keep the water clean and which is chilled to approximately 40° F. by any suitable means such as by passing the water through a refrigerator 8ª. The water is kept in an agitated state by blowing air through the water by means of air pipes 9 connected to any suitable air pump. Of course any other means of agitation may be used. Passing the fruit through the clarifying tank removes all traces of caustic solution and any clinging fibres of the "rag".

Just as the conveyor emerges from the clarifying tank the fruit is subjected to a blast of air to dry the fruit. For this purpose a horizontal air pipe 9 is supported over the conveyor 2 having two or more series of holes bored therein through which air escapes and blows upon the fruit thoroughly drying the same. This completes the section for removing the "rag" and the partition membranes surrounding the segments of the fruit.

After being dried the fruit is conveyed by cross conveyors 10 to the preparation tables where the fruit is segmented and packed in the usual manner.

It is to be understood that minor changes may be made in the construction and method employed without departing from the scope and spirit of the invention as defined in the following appended claims.

I claim:

1. In apparatus for canning citrus fruit, a rag removing unit including the combination with a fruit conveyor, and means for spraying a solution upon the fruit of means for immersing a portion of the fruit in a similar solution while being sprayed.

2. In apparatus for canning citrus fruit, a rag removing unit comprising a conveyor for carrying the fruit, a section for chemically treating the fruit including spraying devices for flowing a chemical solution over the fruit and means for partially immersing the fruit in a similar solution and a section for washing the fruit, said latter section including spraying devices for spraying water upon the fruit, a water tank and means for immersing the fruit in said tank.

3. In apparatus for canning citrus fruit, a rag removing unit including a conveyor for the fruit, spraying devices for flowing a chemical solution over the fruit, means for partially immersing the fruit in a similar solution, additional spraying devices for flowing water over the fruit, a water tank, means for immersing the fruit in said tank, means for maintaining the water in said tank in a chilled state, an air line connected to said tank to agitate the water therein and means for drying the fruit.

In witness whereof, I hereunto subscribe my signature.

ALEXANDER W. STOTT.